United States Patent [19]

Frihart et al.

[11] Patent Number: 4,987,160

[45] Date of Patent: Jan. 22, 1991

[54] RADIATION-CURABLE AMINOAMIDE ACRYLATE POLYMER

[75] Inventors: Charles R. Frihart, Lawrenceville, N.J.; Ronald J. Wroczynski, Schenectady, N.Y.

[73] Assignee: Union Camp Corporation, Wayne, N.J.

[21] Appl. No.: 304,760

[22] Filed: Jan. 31, 1989

[51] Int. Cl.$^5$ .................... C08F 283/04; C08G 69/44; C08L 77/00
[52] U.S. Cl. .................................. 522/164; 525/420.5
[58] Field of Search ....................... 522/164; 525/420.5

[56] References Cited

U.S. PATENT DOCUMENTS

| | | | |
|---|---|---|---|
| 4,218,294 | 8/1980 | Brack | 522/164 |
| 4,329,419 | 5/1982 | Goff et al. | 522/164 |
| 4,670,522 | 6/1987 | Chen | 525/420.5 |

Primary Examiner—Marion C. McCamish
Assistant Examiner—Susan Berman
Attorney, Agent, or Firm—Edward J. Sites

[57] ABSTRACT

A radiation-curable resin useful as a hot melt adhesive is made by the Michael addition of the amino functional groups of an aminoamide thermoplastic polymer with a portion of the acrylate groups of a polyol acrylate. A photoinitiator is optionally added.

13 Claims, No Drawings

RADIATION-CURABLE AMINOAMIDE ACRYLATE POLYMER

BACKGROUND OF THE INVENTION

1. Field of the Invention

The invention relates to a new class of aminoamide acrylate polymers useful as hot melt adhesives which are curable by actinic radiation.

2. Brief Description of the Prior Art

Polyamides are a well known class of thermoplastic polymer. Most polyamides offer no practicable means by which they can be cured to thermoset polymers. A known subclass of polyamides are the aminoamide polymers which have free (i.e. non-acylated) amino groups. Certain of these are useful hot melt adhesives. However, if they are used in a non-crosslinked thermoplastic mode, they are subject to cold flow, remelting, solvent attack, degradation by moisture, and other modes of deterioration. Means are known for crosslinking aminoamides, in fact they are often used themselves as crosslinking agents for epoxy resins, but such crosslinking generally requires a "two package" system, the aminoamide resin being one package, and a co-reactive resin, typically an epoxy resin, as the other package. Such "two package" systems are extensively used, but they have the shortcomings of requiring two containers, measuring and mixing at the point of use, limited working time after the mixing, and they generally require substantial time and/or heating to effect the partial cure to give green strength. Even further time and/or heating is required for complete cure.

It is desirable to have a hot melt adhesive with good gripping power as first applied, but with curing capabilities for greatly improved adhesion, cohesion, resistance to heat, solvents, moisture, and other stresses. It is further desirable to have such an adhesive as a one-package product. It is further desirable to have a long storage and working time but a short cure time.

One known approach to curing hot melt adhesives is to incorporate isocyanate groups so that they are moisture-curable. However such products are prone to premature curing and moreover, since the curing reaction evolves carbon dioxide, they are prone to be weakened by the voids caused by the evolved gas.

It has been known further to blend acrylate polymers into certain polyamides for improved properties such as hot melt adhesive characteristics, but these acrylate polymers have the acrylate group already polymerized and thus rendered nonfunctional, so that such blends were neither chemically linked by covalent bonds nor subject to post-cure to convert them to the thermoset condition.

A number of classes of radiation curable acrylates are known to the art, such as the acrylates of polyurethanes described in U.S. Pat. No. 4,153,776; Friedlander et al. (1979) and the acrylate derivatives of polycaprolactones as in U.S. Pat. No. 3,700,643 (1972); Smith et al. but these do not have in general the hot melt adhesive character of the aminoamide resins. Moreover, they tend to be more costly than aminoamide resins which can be made from byproducts (tall oil, for example).

Our invention provides an improvement over the prior art in that it makes possible a one package system, with good storage properties, combining good hot melt adhesive properties with the ability to cure very rapidly with radiation to a thermoset (crosslinked) product. Thus, our invention can provide hot melt adhesives, varnishes, lacquers, inks and encapsulants which have good initial (green) strength properties upon cooling, but, in addition, are rapidly curable to a crosslinked state where they have improved adhesive strength and are resistant to moisture damage, cold flow, remelting (or softening with heat), blocking, and solvent attack. These characteristics are especially valuable in hot melt adhesives which must perform under challenging conditions of temperature, humidity, and mechanical stress, such as in bonding in outdoor furniture, automotive products and building materials.

SUMMARY OF THE INVENTION

The invention is an acrylate-modified aminoamide resin which comprises the Michael addition product of an aminoamide thermoplastic polymer with a polyol ester having a multiplicity of acrylate ester groups, the ratio of the initial acrylate groups of the polyol ester to the initial amino groups of the aminoamide polymer being greater than 0.5 and less than about 8.0 moles of acrylate per amino-hydrogen function.

The invention also comprises a method for the production of a radiation curable composition of the above-cited type by use of the Michael addition reaction. The invention also comprises a method for the production of radiation cured compositions by exposing such radiation curable compositions to an effective amount of radiation, such as visible or ultraviolet light, high voltage electron beam, gamma radiation, x-rays or other actinic radiation sufficient to produce a cure. A further feature of the invention is the inclusion of a photoinitiator in the uncured product of the invention to favor rapid photocuring.

The cured product of the invention is stronger adhesively and cohesively, more heat resistant, more solvent resistant and more moisture resistant than the aminoamide precursors and related uncured thermoplastic polyamide resins.

DETAILED DESCRIPTION OF THE INVENTION

The invention is an acrylate-modified aminoamide resin which comprises the Michael addition product of an aminoamide thermoplastic polymer with a polyol ester having a multiplicity of acrylate ester groups (i.e. two or more acrylate ester groups), the ratio of the initial acrylate groups of the polyol ester to the initial amino-hydrogen groups of the aminoamide polymer being greater than 0.5 to about 8.0 moles of acrylate per amino function. Thus, each amino-hydrogen group becomes reacted with an acrylate group leaving additional acrylate groups unreacted, in sufficient numbers to enable the subsequent radiation curing step to be carried out when desired.

The compositions of the invention, most broadly, can be made using any thermoplastic aminoamide polymer. Most preferable, however, is the reaction of the polyamides with a monomer containing at least three acrylate groups in a ratio such that the reaction product has at least two free acrylate groups.

In a preferred group of compositions within the invention, the aminoamide is produced from a polymerized unsaturated fatty acid, such as the product known commercially as dimer acid, the aminoamide having an amine number of greater than about 1 and less than about 100; even more preferably, greater than about 3 and less than about 40 (the amine functionality is expressed in a conventional manner in terms of mg. of equivalent KOH/g of sample). With lower functionality, too little acrylate is present for good curing. With higher functionality, there is risk of premature gelation or at least excessive viscosity.

Such preferred aminoamides include those produced from dimer acid and another dibasic acid of from 2 to about 20 carbon atoms, which can be an aliphatic acid such as oxalic, azelaic, sebacic, dodecanedioic or eicosanedioic, or an aromatic acid such as isophthalic, and, as the amine component, a diamine of from 2 to about 36 carbon atoms, such as ethylenediamine, hexamethylenediamine, diaminopropane, piperazine, 4,4'-dipiperidinyl, toluenediamine, methylenedianiline, xylenediamine, methylpentamethylene diamine, diaminocyclohexane, aminoethylpiperazine, polyetherdiamine, and diamines made from dimer acid. Higher polyamines can be included if small enough amounts are used to avoid premature gelation, examples being diethylenetriamine, triethylenetetramine, tetraethylenepentamine, and bishexamethylenetriamine. Higher molecular weight polyetherdiamines can also be used. Suitable aminoamides are commercially available, for example UNI-REZ 2643, 2646, 2648 and 2654 available from Union Camp Corporation, Wayne, N.J. The preparation of members of this class of aminoamide polymer from dimerized fatty acid is described by Peerman et al. in U.S. Pat. No. 3,377,303 (1968).

The term "dimer acid" is in common use in the resin field and refers to polymeric fatty acids typically made from polymerization of unsaturated tall oil fatty acids. These polymeric fatty acids typically have the composition 0–10% $C_{18}$ monobasic acids, 60–95% $C_{36}$ dibasic acids, and 1–35% $C_{54}$ tribasic and higher polymeric acids. The relative ratios of monomer, dimer, trimer and higher polymer in unfractionated "dimer acid" are dependent on the nature of the starting material and the conditions of polymerization and distillation. Methods from the polymerization of unsaturated fatty acids are described for example in U.S. Pat. No. 3,157,681. The use of hydrogenated dimer acids improves the color and oxidative stability of the polyamides of the invention, and is within the scope of the invention, as is the use of a distilled fraction, such as the dimer fraction of dimer acid.

The polyol ester having a multiplicity of acrylate ester groups can be an ester of acrylic or methacrylic acid, or mixture thereof, having from two to about eight such acrylic or methacrylic acid groups. In the present discussion, it should be understood that the generic term "an acrylate" is meant to include methacrylate, and "the acrylic acid" is meant to include methacrylic acid. The polyol may therefore have a minimum of two alcoholic hydroxyl groups before esterification. It is not necessary that all of the alcoholic groups be esterified with the acrylic acid, as long as at least two are so esterified on the average.

Thus, suitable polyol esters of acrylic acids include the following: ethylene glycol diacrylate or dimethacrylate, butanediol diacrylate or dimethacrylate, diethylene glycol diacrylate or dimethacrylate, glycerol trimethacrylate, sorbitol triacrylate, trimethylolethane triacrylate, trimethylolpropane triacrylate, ethoxylated trimethylolpropane triacrylate, pentaerythritol tri- or tetraacrylate or tri- or tetramethacrylate, and multifunctional acrylates or methacrylates of dipentaerythritol or tripentaerythritol, sucrose pentamethacrylate, bisphenol-A bis(hydroxypropyl) ether diacrylate, and the like, with the materials trimethylolethane triacrylate, trimethylolpropane triacrylate, ethoxylated trimethylolpropane triacrylate, pentaerythritol tri- or tetraacrylate or tri- or tetramethacrylate being most preferred.

By Michael addition is meant the addition reaction of an amino group across an activated double bond, typically of an ester, to form a new more highly alkylated amine, thus:

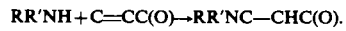

$$RR'NH + C = CC(O) \rightarrow RR'NC - CHC(O).$$

Such reactions generally proceed spontaneously with moderate heating. R and R' in the above formula can be hydrocarbyl or hydrogen. In the present context, at least one of R and R' will be hydrocarbyl, being a part of the aminoamide. R and R' may also be aminodiethylene as, for example, when piperazine is used.

The Michael addition is exothermic and one means for noting its completion is the cessation of heat evolution. Other physical means such as leveling out of the viscosity may be used to detect completion of the Michael addition reaction. The Michael addition can also be followed analytically, by many of the well known analytical methods for double bond assay, such as nmr or infrared. For example, the ratio of olefinic protons to saturated aliphatic protons can be measured by nmr, and will be seen to level out at a reduced ratio relative to the initial reaction mixture as the Michael addition comes to completion. The infrared absorption bands characteristic of the double bond will also be seen to level out as the Michael addition reaction comes to completion. It is even possible to note the substantial completion of the reaction by the disappearance of the characteristic odor of acrylate monomer and/or a separate gas phase. As will be obvious to one skilled in resin synthesis, once the reaction conditions for completion of the desired reaction are determined by analytical means, further batches made from the same reactants can be made by merely conforming to the same time and temperature regime.

The ratio of the aminoamide to the acrylate should be such that the ratio of the initial acrylate groups of the polyol ester to the initial amino functional groups of the aminoamide polymer is greater than one so that each amino group becomes reacted with an acrylate group leaving additional acrylate groups unreacted. To assure this relationship to the first approximation is a matter of simple arithmetic, the amino functionality of the aminoamide resin and the acrylate functionality of the polyol acrylate being known quantities. For instance, if a diacrylate is used, then the quantity of diacrylate must be about 1.0 mole per molar equivalent of amino functional groups in the aminoamide resin, so that when the Michael addition is over, the product will have some unreacted acrylate group to serve in the curing step. It should be noted that a primary amino group is equivalent to two amino functions since the Michael addition can go twice on it, whereas a secondary amino group is equivalent to one amino group. One skilled in the art of resin manufacture will recognize that empirical adjustment slightly to one side or the other of the stoichiometric relationship may be useful to overcome such factors as hindered functional groups. A preferred aminoamide resin is amine-terminated hot-melt polyamides such as UNI-REZ 2622, 2636, 2643, 2646, 2648 and 2654, and the preferred polyfunctional acrylate resins are trimethylolethane triacrylate, trimethylolpropane triacrylate, ethoxylated trimethylolpropane triacrylate, pentaerythritol tri- or tetraacrylate or tri- or tetramethacrylate. With these preferred reactants, a preferred ratio for reacting them is 0.5 to 8.0 acrylate groups per amino group.

Since the aminoamide thermoplastics used in the invention are not highly polyfunctional, gelation will rarely be encountered, however if it does occur during the Michael addition, it will be obvious to one skilled in the art of resin manufacture that reduction in the amount or the amino number of the aminoamide, or in the polyfunctionality of the acrylate will suffice to escape the problem.

In order to carry out the Michael addition reaction, the two reactants have to be brought into a common phase. While this can be accomplished by use of a solvent such as methanol or ethylene dichloride, we find it advantageous to avoid the use of solvent with its attendant recovery problems, by merely melting the polyamide and admixing it with the acrylate ester, which is usually a liquid or an easily melted solid. Since at least one of the reactants is a solid, it is preferred that the reaction mixture be heated at least up to the softening point of the lowest melting reactant. The reaction temperature will generally not exceed 190° C., since at higher temperatures, some cracking or premature gelation of the reaction product can occur. The addition can be carried out in any suitable vessel having resin mixing capabilities, thus a kettle with a stirrer may be used, a Banbury mixer, or even an extruder.

Generally, no purification steps are needed after the Michael reaction has completed itself. It is possible to extract, at this point, a temporary inhibitor such as hydroquinone, which may have been added to inhibit undesired thermal polymerization during the Michael addition reaction. Such extraction can also be accomplished by solvents such as acetone or aqueous alkali. However, it is preferred to run the reaction without a solvent and not to use any solvent processing step after the Michael addition reaction. The reaction product is generally a colorless to light yellow to light brown solid at room temperature. It is conveniently pelletized, granulated or powdered prior to packaging.

It is an option, in the product of the invention, to include a photoinitiator, which is especially advantageous if the product is intended to be cured by light. The photoinitiator can be omitted for a product intended to be cured by electron beam, gamma radiation, or x-ray. The presence of the photoinitiator of course allows the product to be cured by any of these means.

Suitable optional photoinitiators are benzoin ethers, dialkoxyacetophenones, alpha-hydroxycyclohexyl aryl ketones, alpha-ketophenylacetate esters, benzyldialkylketals, chloro- or alkylthioxanthones, alpha-amino- or alpha-hydroxyalkyl aryl ketones, and the like. An example is Irgacure 907, an alpha-aminoacetophenone made by Ciba-Geigy. Generally, amine synergists will not be necessary when a photoinitiator normally used with an amine synergist is employed, such as benzophenone or a thioxanthone, since the resin itself provides amino groups.

The photoinitiator can be mixed in at the time of the Michael addition reaction, either before, during or after the reaction.

It is also an option to include an effective amount of a stabilizer, such as a phenolic inhibitor of free radical polymerization, exemplified by methoxyphenol, hydroquinone benzoquinone, phenothiazine, or the like, at levels of from about 5 ppm to 5,000 ppm, to lengthen the shelf life of the product. In many cases, such inhibitors will be found already present in the polyol acrylates used as reactants.

It will be evident to one skilled in the art of adhesive formulation that other additives such as fillers, reinforcing agents, coupling agents, colorants, odorants, other comonomers, resins, tackifiers, plasticizers, lubricants, stabilizers, antistats, and the like can optionally be added. It is a further option to add additional amounts of a polyol acrylate to increase the crosslink density and give a more firmly cured product, or conversely to add a monoacrylate or a thermoplastic resin to get a softer more pliable product.

The invention will be made clearer by reference to the following examples presented for purposes of illustration and not for limitation, and for purposes of setting forth the best mode contemplated for carrying out the invention.

In all examples below, parts or percentages are by weight.

EXAMPLE 1

Preparation of precursor aminoamide polymers.

Polyaminoamides were produced by adding all the reactive ingredients (acids and amines) to a flask and heating under nitrogen for a two hour period to 225–250° C. This temperature was maintained with stirring over a further two hour period under nitrogen and for an additional two hours under a vacuum of 25–30" (Hg). The resins were then cooled rapidly to ambient temperature.

Resin (a): The components used were polymeric fatty acid (Unidyme 14) (78 equiv. %), linear dicarboxylic acid (14 equiv. %), linear monocarboxylic acid (8 equiv. %), piperazine (54 equiv. %), and linear short chain diamine (64 equiv. %). In some cases, stabilizers were added. The product resin has a viscosity of 240 centipoise at 190° C., a ring and ball softening point of 134° C., an acid number of 3.3 and an amine number of 22.8.

Resin (b): The same procedure was followed but the components were polymeric fatty acid (83 equiv. %), linear dicarboxylic acid (13 equiv. %), linear monocarboxylic acid (4 equiv. %), piperazine (58 equiv. %) and linear short chain diamine (50 equiv. %). The product had a viscosity of 1800 centipoise at 225° C., a ring and ball softening point of 125° C., an acid number of 1.0 and an amine number of 4.8.

EXAMPLE 2

Preparation of uncured product resin of the invention.

The aminoamide resin (a) made in example 1 (300 g.) was placed with 6 g Irgacure 907 (a photoinitiator made by Ciba-Geigy Corp., having the structure 2-methyl-1-[4-(methylthio)phenyl]-2-morpholinopropanone-1) and 0.4 g. hydroquinone as stabilizer in a reactor and heated to 150° C. to liquefy the resin. A vacuum was applied to dry the resin and then 54 g. of trimethylolpropane triacrylate was added and mixed in. After 10 minutes of mixing time, the Michael addition reaction was deemed complete by formulation of a single phase and low acrylate odor. The reaction product was discharged from the reactor and cooled. It was found to have a viscosity of 2300 centipoise at 190° C. and had a ring and ball softening point of 128° C.

EXAMPLE 3

Curing of the product resin of Example 2.

A 60 mil film of the product of example 2 was exposed to a 40 watt U.V. lamp six inches from lamp for ten minutes. After this treatment, the film did not melt even when heated to 220° C. The product was insoluble in refluxing toluene, bitanol, isopropanol (1:2:1, v/v/v) which dissolved almost all dimer-based polyamides, including the precursor and uncured resins. The strength properties of the cured and uncured polymer are given in Table 1.

EXAMPLE 4

Preparation of another uncured product resin of the invention.

The product (b) of example 1 (300 g.), Irgacure 907 (6 g.), and hydroquinone (0.4 g.) were heated in a reactor to 150° C. to liquefy, then dried by vacuum. Then, 10 g. of trimethylolpropane triacrylate were added. After ten minutes of mixing at 150° C., the product was discharged from the reactor and cooled to ambient. The product of the Michael addition reaction had a viscosity of 4660 cps at 190° C. and a ring and ball softening point of 123° C.

EXAMPLE 5

Curing of the product resin of Example 4.

In a manner similar to example 3, a 60 mil film of the product of example 4 was exposed to a 40 watt U.V. lamp six inches from lamp for 10 min. The product did not melt even when heated up to 220° C. The product was insoluble in refluxing toluene, bitanol, isopropanol (1:2:1, v/v/v) which dissolved almost all dimer-based polyamides, including the precursor and uncured resins. The strength properties are given in Table 1.

TABLE 1

Strength Properties of Precursor, Uncured Michael Addition Product, and Cured Michael Addition Product

| Resin (example no.) | Tensile Stress at Break | Tensile Strain at Break | Softening Point, ° C. |
|---|---|---|---|
| Precursor, ex. 1 (a) | 391 psi | 26% | 134 |
| Uncured resin, ex. 2 | 299 | 40 | 128 |
| Cured resin, ex. 3 | 1380 | 67 | Non-melting* |
| Precursor, ex. 1 (b) | 512 | 371 | 125 |
| Cured resin, ex. 5 | 1115 | 502 | Non-melting* |

*Up to 220° C.

EXAMPLE 6

Reaction in a solvent medium.

To a solution of 150 parts (all quantities by weight) pentaerythritol tetraacrylate and 0.8 parts of hydroquinone in a solvent quantity of ethylene dichloride was added 100 parts of an amide-terminated polyamide (made from "dimer-14 acid," which is a distilled dicarboxylic acid fraction from the crude dimer acid, ethylenediamine, and piperazine) with an amine number of 41. After stirring for 3 days at room temperature, the solvent was partly removed and an ether-acetone mixture was added to precipitate polymer. The nmr analysis of the waxy polymer thus precipitated showed the presence of both acrylate and amide structures, the ratio of acrylate groups (olefinic hydrogens at 5.8–6.2 ppm chemical shift relative to tetramethylsilane reference standard) to pentaerythritol methylene groups (at 4.0–4.5 ppm) being reduced relative to the ratio in the starting material.

The product was found to be curable by exposure to an ultraviolet lamp.

EXAMPLE 7

Reaction in a solvent medium at a lower level of acrylate relative to aminoamide polymer.

The reaction of example 6 was repeated but the ratio of pentaerythritol tetraacrylate to the polyamide was 1.1:1 by weight, 1% hydroquinone was used, and the reaction was run at 85–90° C. for 5 hours. The solvent was then stripped under vacuum and the residual product was washed with acetone to remove any unreacted tetraacrylate. The resulting product exhibited nmr bands of both acrylate and amide, but the olefinic proton to pentaerythritol methylene proton ratio was 1.19:1 (compared to the starting acrylate in which it is 1.5:1).

The product was found to be curable by exposure to an ultraviolet lamp.

EXAMPLE 8

Electron beam curing.

Precut sheets of cardboard shaped as components of a box are bonded with the product of example 2 applied as a hot melt adhesive. Initial tack is sufficient to bond the sheets in an adequate manner for initial assembly of the box. The bonds are then irradiated through the cardboard by about 1 megarad of electron beam energy from a scanning electron accelerator. The assembled box is found to have bonding of enhanced strength as compared to a box not so irradiated.

EXAMPLE 9

Gamma ray curing.

Syringes packaged in blister packs using the product of example 4 as a hot melt adhesive to seal the plastic and paper layers together are passed through a gamma ray flux from a Co 60 source. Sterilization of the package and curing of the adhesive are accomplished simultaneously. By virtue of the cured adhesive, which cannot be melted and resealed, the package is rendered more secure and tamperproof.

We claim:

1. A radiation-curable acrylate-modified aminoamide resin which comprises the Michael addition product of an aminoamide thermoplastic polymer derived from a polymerized unsaturated fatty acid with a polyol ester having a multiplicity of acrylate ester groups, the ratio of the initial acrylate groups of the polyol ester to the initial amino functional groups of the aminoamide polymer being greater than 0.5 and less than about 8.0.

2. A radiation-curable acrylate-modified aminoamide resin as defined in claim 1 wherein said aminoamide thermoplastic polymer is derived from dimer acid.

3. A radiation-curable acrylate-modified aminoamide resin as defined in claim 1 wherein said aminoamide thermoplastic polymer is derived from a polymerized unsaturated fatty acid, a linear diacid, piperazine, and a linear short chain diamine.

4. A radiation-curable acrylate-modified aminoamide resin as defined in claim 1 wherein said aminoamide thermoplastic polymer is an amino-terminated aminoamide derived from the dicarboxylic acid fraction of dimer acid, a linear diacid, piperazine, and ethylene diamine.

5. A radiation-curable acrylate-modified aminoamide resin as defined in claim 2 wherein said aminoamide thermoplastic polymer is derived from dimer acid, linear diacid, piperazine, short chain diamines, and polyether diamine.

6. A radiation-curable acrylate-modified aminoamide resin as defined in claim 2 wherein said aminoamide thermoplastic polymer is derived from dimer acid, linear diacid, and short chain diamines.

7. A radiation-curable acrylate-modified aminoamide resin as defined in claim 2 wherein said aminoamide thermoplastic polymer is derived from dimer acid, linear diacid, dimer diamine, short chain diamines, and polyether diamine.

8. A radiation-curable acrylate-modified aminoamide resin as defined in claim 1 wherein said aminoamide thermoplastic polymer has an amine number of between 1 and 100.

9. A radiation-curable acrylate-modified aminoamide resin as defined in claim 1 wherein said aminoamide thermoplastic polymer has an amine number of between about 3 and about 40.

10. A radiation-curable acrylate-modified aminoamide resin as defined in claim 1 wherein said polyol ester is a polyol triacrylate selected from the group consisting of trimethylolpropane triacrylate, ethoxylated trimethylolpropane triacrylate, and trimethylolpropane trimethacrylate.

11. A radiation-curable acrylate-modified aminoamide resin as defined in claim 1 wherein said polyol ester is pentaerythritol tetraacrylate.

12. A radiation-curable acrylate-modified aminoamide resin as defined in claim 1 wherein said aminoamide thermoplastic polymer is derived from a polymerized unsaturated fatty acid, a linear aliphatic dicarboxylic acid, piperazine, and a linear short chain diamine, and has an amine number between about 3 and about 40, and wherein said polyol ester is trimethylolpropane triacrylate.

13. A photocurable acrylate-modified aminoamide resin which comprises the composition defined in claim 1 to which an effective amount of a photoinitiator has been added.

* * * * *